US011169920B2

(12) United States Patent
Stonelake et al.

(10) Patent No.: US 11,169,920 B2
(45) Date of Patent: Nov. 9, 2021

(54) CACHE OPERATIONS IN A HYBRID DUAL IN-LINE MEMORY MODULE

(71) Applicant: Micron Technology, Inc., Boise, ID (US)

(72) Inventors: Paul Stonelake, San Jose, CA (US); Horia C. Simionescu, Foster City, CA (US); Samir Mittal, Palo Alto, CA (US); Robert M. Walker, Raleigh, NC (US); Anirban Ray, Santa Clara, CA (US); Gurpreet Anand, Pleasanton, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/573,305

(22) Filed: Sep. 17, 2019

(65) Prior Publication Data

US 2020/0089610 A1    Mar. 19, 2020

Related U.S. Application Data

(60) Provisional application No. 62/732,191, filed on Sep. 17, 2018.

(51) Int. Cl.
*G06F 12/0811* (2016.01)
*G06F 12/0897* (2016.01)
(Continued)

(52) U.S. Cl.
CPC ...... *G06F 12/0811* (2013.01); *G06F 12/0862* (2013.01); *G06F 12/0888* (2013.01);
(Continued)

(58) Field of Classification Search
CPC .......... G06F 12/0811; G06F 12/0862; G06F 12/0868; G06F 12/0888; G06F 12/0897; G06F 2212/1024; G06F 2212/608
(Continued)

(56) References Cited

U.S. PATENT DOCUMENTS

| 6,532,521 B1* | 3/2003 | Arimilli | G06F 9/30047 |
| | | | 711/122 |
| 8,140,764 B2* | 3/2012 | Shen | G06F 12/0864 |
| | | | 711/129 |
| 9,158,684 B2* | 10/2015 | Lee | G06F 12/0246 |

(Continued)

OTHER PUBLICATIONS

PCT International Search Report and Written Opinion for International Application No. PCT/US2019/051586 dated Jan. 6, 2020, 12 pages.

*Primary Examiner* — Reginald G Bragdon
*Assistant Examiner* — Aaron D Ho
(74) *Attorney, Agent, or Firm* — Lowenstein Sandler LLP

(57) ABSTRACT

A system includes a first memory component of a first memory type, a second memory component of a second memory type with a higher access latency than the first memory component, and a third memory component of a third memory type with a higher access latency than the first and second memory components. The system further includes a processing device to identify a section of a data page stored in the first memory component, and access patterns associated with the data page and the section of the data page. The processing device determines to cache the data page at the second memory component based on the access patterns, copying the section of the data page stored in the first memory component to the second memory component. The processing device then copies additional sections of the data page stored at the third memory component to the second memory component.

18 Claims, 6 Drawing Sheets

(51) Int. Cl.
G06F 12/0888 (2016.01)
G06F 12/0862 (2016.01)

(52) U.S. Cl.
CPC ............ G06F 12/0897 (2013.01); *G06F 2212/1024* (2013.01); *G06F 2212/608* (2013.01)

(58) Field of Classification Search
USPC .......................................................... 711/122
See application file for complete search history.

(56) References Cited

U.S. PATENT DOCUMENTS

| | | | | |
|---|---|---|---|---|
| 2008/0183949 A1* | 7/2008 | Ly | ............... | G11C 16/0483 |
| | | | | 711/103 |
| 2010/0161890 A1* | 6/2010 | Kim | ............... | G06F 12/0804 |
| | | | | 711/103 |
| 2013/0198459 A1* | 8/2013 | Joshi | ............... | G06F 12/0891 |
| | | | | 711/130 |
| 2014/0289470 A1* | 9/2014 | Thomas | ............... | G06F 12/0866 |
| | | | | 711/122 |
| 2015/0012690 A1* | 1/2015 | Bruce | ............... | G06F 12/0804 |
| | | | | 711/103 |
| 2015/0039837 A1* | 2/2015 | Quan | ............... | G06F 3/061 |
| | | | | 711/136 |
| 2015/0169238 A1* | 6/2015 | Lee | ............... | G06F 12/0871 |
| | | | | 711/103 |
| 2016/0370998 A1 | 12/2016 | Shung et al. | | |
| 2017/0052896 A1 | 2/2017 | Nachimuthu et al. | | |
| 2018/0074971 A1 | 3/2018 | Maxey et al. | | |
| 2018/0107595 A1 | 4/2018 | Jung | | |
| 2018/0232310 A1 | 8/2018 | Chang et al. | | |
| 2018/0275921 A1* | 9/2018 | Katagiri | ............... | G06F 3/0604 |
| 2019/0243570 A1* | 8/2019 | Mittal | ............... | G06F 12/0897 |
| 2019/0272104 A1* | 9/2019 | Durnov | ............... | G06F 3/0673 |
| 2019/0333548 A1* | 10/2019 | Mcglaughlin | ............... | G11C 11/4072 |

* cited by examiner

CACHE OPERATIONS IN A HYBRID DUAL IN-LINE MEMORY MODULE

RELATED APPLICATION

This application claims the benefit of U.S. Provisional Patent Application No. 62/732,191 filed on Sep. 17, 2018, the entire contents of which are hereby incorporated by reference herein.

TECHNICAL FIELD

Embodiments of the disclosure relate generally to memory sub-systems, and more specifically, relate to cache operations in a hybrid dual in-line memory module.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
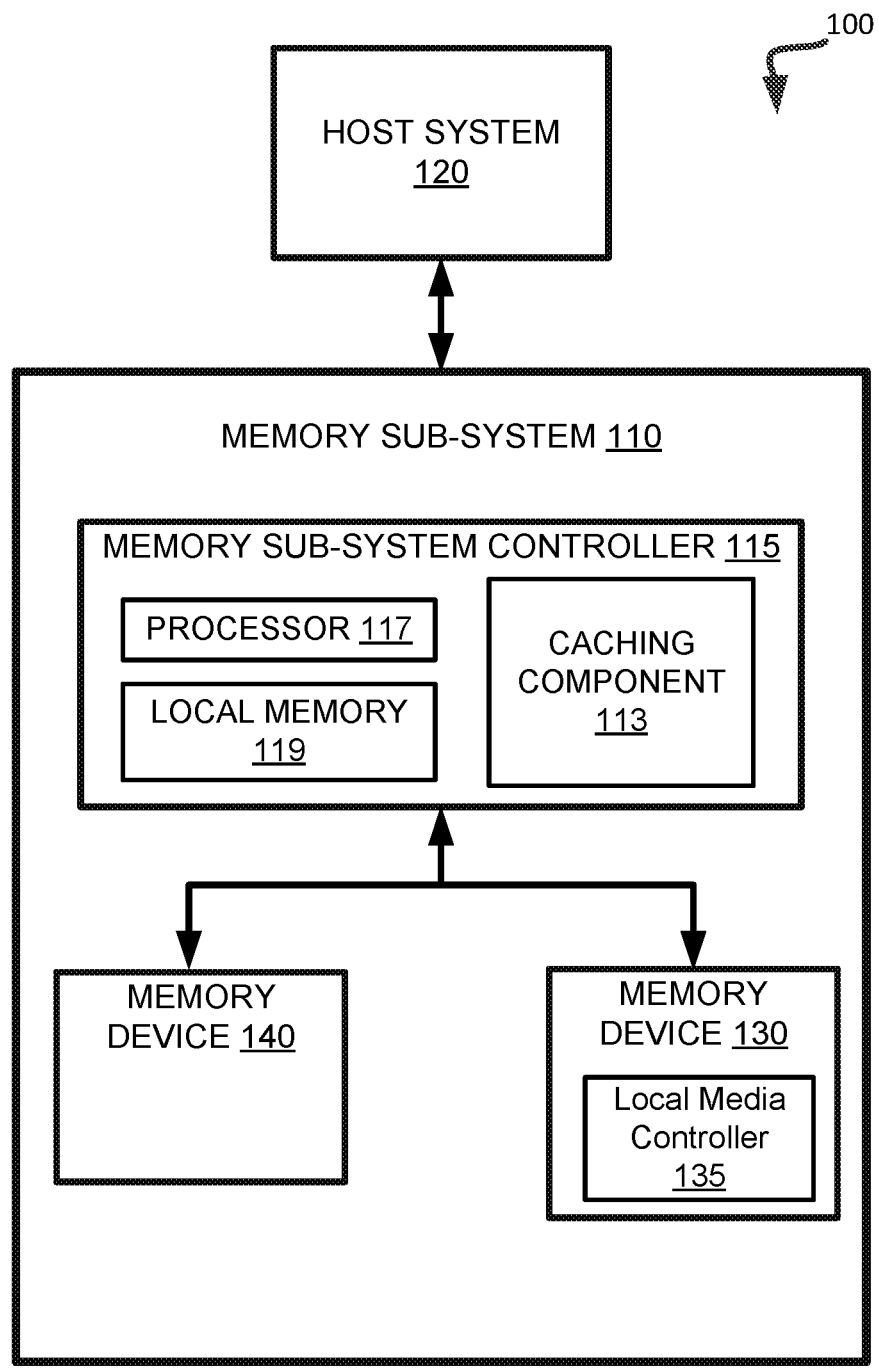
FIG. 1 illustrates an example computing environment that includes a memory sub-system in accordance with some embodiments of the present disclosure.

Aspects of the present disclosure are directed to cache operations in a hybrid dual in-line memory module. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components such as memory devices that store data. The host system can provide data to be stored at the memory sub-system and can request data to be retrieved from the memory sub-system.

A memory sub-system can include multiple memory devices that can store data from a host system. The memory devices can be non-volatile memory devices, such as three-dimensional cross-point ("3D cross-point") memory devices that are a cross-point array of non-volatile memory that can perform bit storage based on a change of bulk resistance, in conjunction with a stackable cross-gridded data access array. Another example of a non-volatile memory device is a negative-and (NAND) memory device. Other examples of non-volatile memory devices are described below in conjunction with FIG. 1. The memory sub-system includes a memory sub-system controller that can communicate with the memory devices to perform operations such as reading data, writing data, or erasing data at the memory devices and other such operations. A memory sub-system controller is described in greater detail below in conjunction with FIG. 1.

The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data. The logical address information (e.g., LBA, namespace) can be part of metadata for the host data. The metadata and host data, together, is hereinafter referred to as "payload." Metadata, host data, and parity data, which is used for error correction, can collectively form an error correction code (ECC) codeword. Metadata can also include data version (e.g. used to distinguish age of data written), valid bitmap (which LBAs or logical transfer units contain valid data), etc.

Dynamic random access memory (DRAM) is expensive and has a limited capacity, such as DDR4 dual in-line memory modules (DIMMs). Larger capacity memory types have arisen (e.g., 3D cross-point) with some tradeoffs. Although 3D cross-point can be slower than DRAM, it is fast enough that if used in conjunction with a faster access cache with a high hit rate, it can emulate the faster access of DRAM only DIMMs. Conventional memory sub-systems of one type can be used in conjunction (e.g., as a cache) with other types of memory-subsystems if a host system is designed to accommodate both memory sub-system types. However, the different types of memory can use different interface protocols and the cache transfers between one DIMM with DDR4 and one DIMM with 3D cross-point can cause high traffic along the interface between the host and the DIMMs, thereby reducing overall performance of both DIMMs.

In addition, memory types can be accessed at different data granularities. For example, 3D cross-point memory can be accessed at a much higher granularity (i.e., data transactions can occur in smaller data sizes) than the page size of a usefully large DRAM cache. This difference in access size vs cache page size can cause difficulties when tracking data access patterns and selecting which data to transfer to the memory acting as the cache (e.g., DRAM). Furthermore, the amount of data required to manage the cache using a high granularity can be very large due to the high number of portions of data and amount of metadata per cache entry.

Aspects of the present disclosure address the above and other deficiencies by having a memory sub-system that includes a hybrid DIMM that uses one of the memory components of the DIMM as a lower latency cache (i.e., better performing medium with faster data access speeds) for the other memory module with higher latency (i.e., slower access speeds) and higher data capacity. The DIMM controller (e.g., memory sub-system controller) can include a memory component that acts as a low capacity cache for storing portions of data pages, or "sectors," as they are accessed by a host system. Each time a sector enters the cache in the controller, the access to that sector can be tracked to provide access data to a caching component, such as a cache manager. In addition, the cache manager can aggregate the access data of each sector of a page that is in the cache within the controller. The cache manager can then select which pages should be stored in the DRAM cache for faster data access.

Advantages of the present disclosure include, but are not limited to, providing a hybrid DIMM with a high data capacity with data access latency comparable to DRAM only (DDR4) DIMMs. The hybrid DIMM can also be much less expensive due to the relatively low cost of 3D cross-point memory in comparison to DRAM. Thus, a hybrid DIMM that is cheaper, with higher data capacity, comparable performance, and the ability to provide persistent memory is described.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, a vehicle (e.g., airplane, drone, train, automobile, or other conveyance), Internet of Things (IoT) devices, embedded computer (e.g., one included in a vehicle, industrial equipment, or a networked commercial device) or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A 3D cross-point memory device is a cross-point array of non-volatile memory cells that can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased.

Although non-volatile memory components such as 3D cross-point type and NAND type memory are described, the memory device 130 can be based on any other type of non-volatile memory, such as read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, a particular memory component can include an SLC portion, and an MLC portion, a TLC portion, or a QLC portion of memory cells. The memory cells of the memory devices 130 can be grouped as pages or codewords that can refer to a unit of the memory device used to store data. With some types of memory (e.g., NAND), pages can be grouped to form blocks. Some types of memory, such as 3D cross-point, can group pages across dice and channels to form management units (MUs).

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. In some embodiments, the memory device 130 is a managed memory device, which is a raw memory device combined with a local controller (e.g., local controller 135) for media management within the same memory device package. An example of a managed memory device is a managed NAND (MNAND) device.

The memory sub-system 110 includes a caching component 113 that can perform caching operations in a hybrid DIMM. In some embodiments, the memory sub-system controller 115 includes at least a portion of the caching component 113. For example, the memory sub-system controller 115 can include a processor 117 (processing device) configured to execute instructions stored in local memory 119 for performing the operations described herein. In some embodiments, the caching component 113 is part of the host system 120, an application, or an operating system.

The caching component 113 can track how much a host system accesses different portions of data stored in a memory component with higher capacity and higher latency, such as 3D cross-point. The caching component 113 can identify host access patterns associated with sectors of data (sections of a page of data) that are temporarily cached in static random access memory (SRAM) (e.g., local memory 119) in the memory sub-system controller 115. The cache component 113 can then determine, based on the access patterns identified, whether the sector of data and its associated page should be stored (cached) in a lower latency memory 140, such as DRAM. Additionally the cache component 113 can also identify host access patterns associated with pages cached in 140, to allow decisions to be made between retaining existing pages in cache 140 or make space for new pages based on sectors accessed in SRAM 119. Further details with regards to the operations of the caching component 113 are described below.

Figure 2:
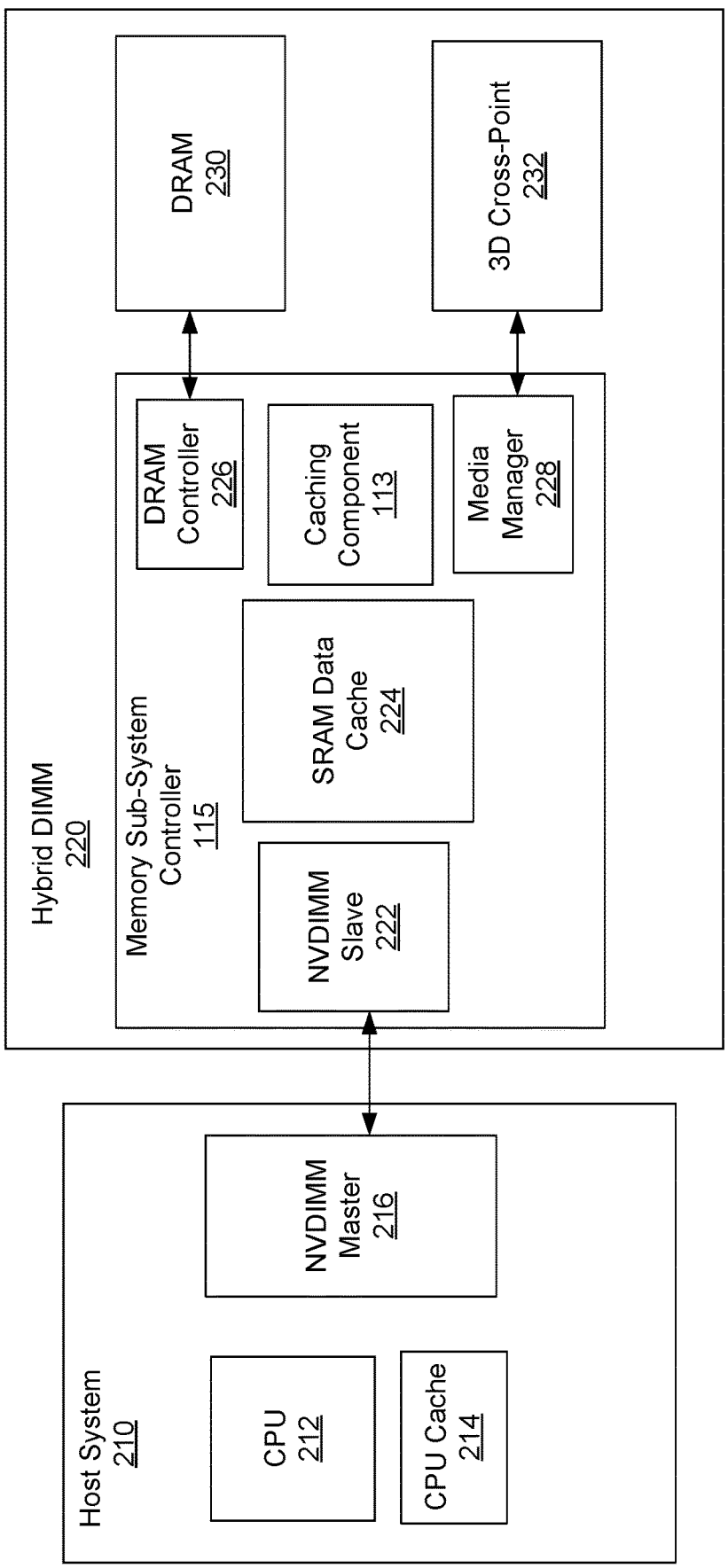
FIG. 2 is a block diagram illustrating an example hybrid dual in-line memory module utilizing a DRAM memory component as a cache for a cross-point array memory component, in accordance with some embodiments of the present disclosure.

FIG. 2 is a block diagram illustrating a system comprising a hybrid DIMM using DRAM as a cache for 3D cross-point memory. Host system 210 can include a central processing unit (CPU) 212, a CPU cache 214 and a non-volatile dual in-line memory module (NVDIMM) master 216. As described in FIG. 1, the host system 210 can be a computing device such as a desktop computer, laptop computer, network server, mobile device, a vehicle (e.g., airplane, drone, train, automobile, or other conveyance), Internet of Things (IoT) devices, embedded computer (e.g., one included in a vehicle, industrial equipment, or a networked commercial device) or such computing device that includes a memory and a processing device. The host system 210 can provide data to be stored at the hybrid DIMM 220 and can request data to be retrieved from the hybrid DIMM 220. CPU 212 can be a processor or system-on-a-chip (SOC) comprising an arithmetic logic unit, a management unit, etc. to execute instructions associated with applications executed by the host system 210. CPU cache 214 can include one or more levels of cache memory for quick data access to highly accessed, or recently accessed data. In some embodiments, the CPU cache 214 or the CPU 212 can include a cache controller to determine which data to cache at the different levels of CPU cache 214. NVDIMM master 216 can be an interface of the host system 210 used to communicate with a memory module that is coupled to the host system 210 such as the hybrid DIMM 220. For example, the NVDIMM master 216 interface can be an asynchronous interface that supports variable latency data transfer, such as NVDIMM-P.

Hybrid DIMM 220 can be a memory module that can be coupled to a host system, such as host system 210. Hybrid DIMM 220 can include a memory sub-system controller 115, a DRAM memory component 230 and a 3D cross-point memory component 232. Memory sub-system controller 115 can store data at the 3D cross-point memory 232 and utilize the DRAM memory 230 as a data cache to provide lower latency access to data with higher access rates. Lower latency access can mean faster access speeds while higher latency access can mean slower access speeds. The memory sub-system controller 115 can include an NVDIMM slave 222 interface for communicating with the host system 210. The NVDIMM interface can be an asynchronous interface that provides support for variable latency memory access, such as NVDIMM-P. The variable latency support can provide the ability of the host system 210 to access data from both the DRAM 230 as well as the 3D cross-point memory 232 through a single interface protocol. The memory sub-system controller 115 can include a DRAM controller 226 to provide an interface to the DRAM 230, and a media manager 228 to provide an interface and media management tools, for the 3D cross-point memory 232.

Memory sub-system controller 115 can further include an SRAM data cache 224 to act as the highest level cache for data within the hybrid DIMM 220. All data that is read or written by the host system 210 at the hybrid DIMM 220 can be cached at the SRAM data cache 224 until the sector is evicted, written back to the 3D cross-point 232, or cached at the DRAM 230. The caching component 113 of the memory sub-system controller can include one or more components to track data access patterns and to apply heuristics to the data access pattern information to determine if data that is temporarily cached at the SRAM data cache 224 should be cached at the DRAM 230. The heuristics can provide a caching scheme that provides for a very high hit rate such that host access of the hybrid DIMM 220 closely emulates access speed of a DRAM only DIMM.

Because any data that is accessed can be forwarded through the SRAM data cache 224, the caching component 113 can track the access of each section of data that enters the SRAM data cache 224, and similarly can track the access of each page of data in the DRAM cache 230. Each section of data (also referred to as sectors) can be included in, or associated with, a page of data stored in the 3D cross-point memory 232. By tracking the access patterns of each sector, the caching component 113 can additionally aggregate the access data of all sectors of a page that are in the SRAM data cache 224. Thus, the caching component 113 can track data access at the sector granularity as well as the page granularity. Once the caching component 113 determines that a sector in the SRAM data cache 224 should be cached in the DRAM 230, the sector and the remaining sectors within the page at the 3D cross-point memory 232 can be copied to the DRAM 230 for faster access.

Figure 3:
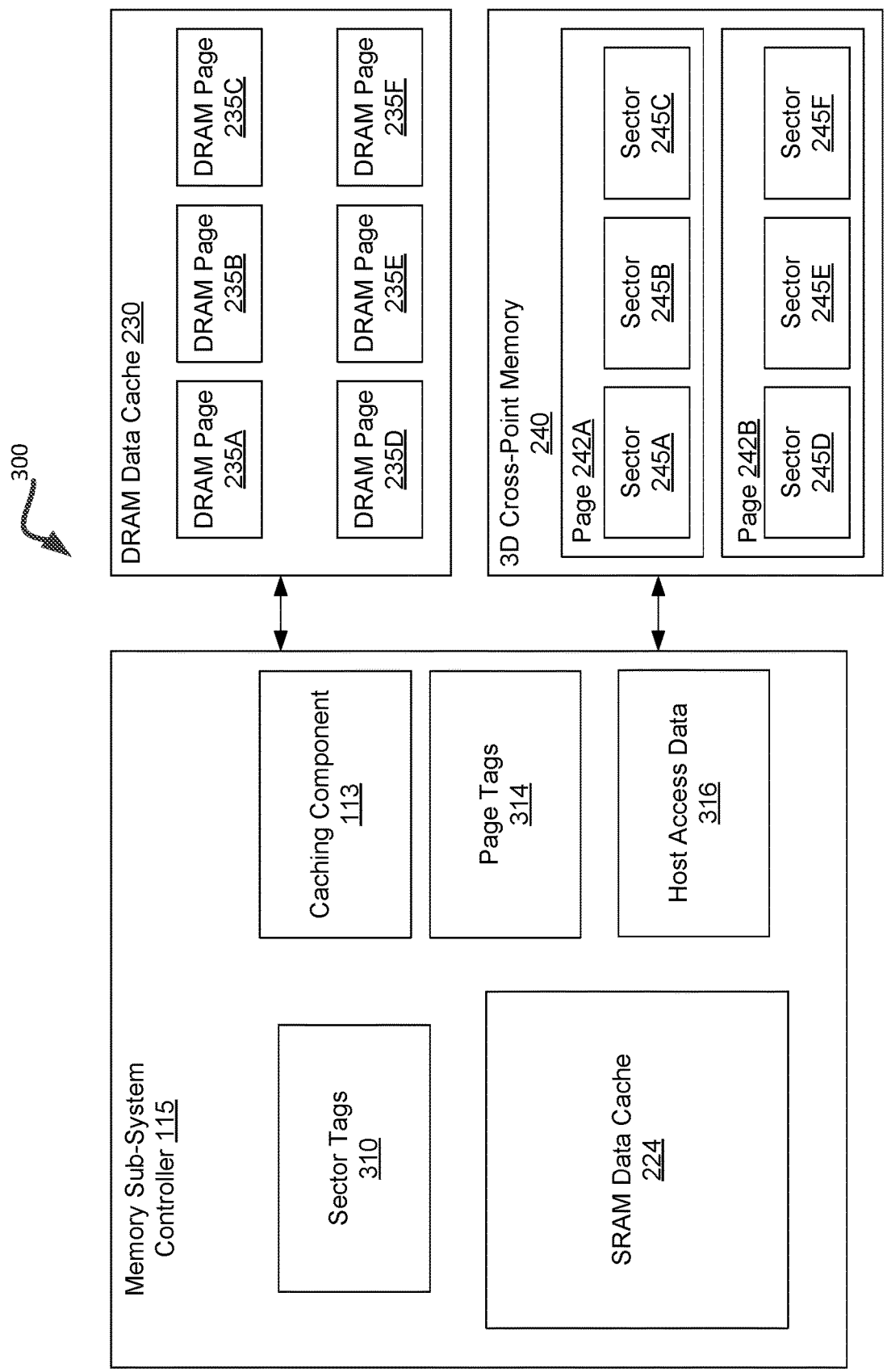
FIG. 3 is a block diagram illustrating a hybrid dual in-line memory module controller, in accordance with some embodiments of the present disclosure.

FIG. 3 is a block diagram illustrating a hybrid DIMM 300 utilizing a low latency memory type as a cache for a higher latency, higher capacity memory type. The hybrid DIMM 300 can include a memory sub-system controller 115, a DRAM data cache 230, and a 3D cross-point memory 240. The DRAM data cache 230 can manage data at a larger granularity (larger data size) than the 3D cross-point memory 240. For example, the DRAM pages 235A-F can comprise data at a granularity of around 1 KB while the 3D cross-point sectors 245A-F can comprise data at a much smaller granularity, such as 64 bytes (referred to as sectors). In addition, the sectors 245A-F can also be included in a larger page (i.e., pages 242A-B). Data can be transferred between the SRAM data cache 224 and the 3D cross-point memory 240 at the sector granularity. The DRAM data cache 230 can receive and store data at the page level (i.e., DRAM pages 245A-F). Sectors stored at the SRAM data cache 224 can be combined with the remaining sectors of the corresponding page from 3D cross-point memory 240 prior to storing the page in the DRAM data cache 230.

Memory sub-system controller 115 can include an SRAM data cache 224 for caching data associated with recent write and read accesses, and additional memory for storing sector tags 310, page cache tags 314, and host access data 316. In addition, memory sub-system controller 115 can include a caching component 113 for determining which data stored at the 3D cross-point memory 232 to cache at the DRAM data cache 230. The caching component 113 can use host access data 316 to determine which data to cache at the DRAM data cache 230. The host access data 316 can include the rate of access of a sector and page (i.e., temperature), and how recently the data has been accessed (least recently accessed data) to decide how likely the data is to be accessed in the near future. The SRAM data cache 224 can store and manage data at a sector granularity (e.g., smaller portion of a page) and can track the number, timing, and rate of access to each of the sectors stored in the SRAM data cache 224.

Host access data 316 can be collected when a sector of data temporarily cached at the data SRAM data cache 224 is accessed. The access data 316 can also be collected when a page is accessed in the DRAM data cache 230. Sector tags 310 can include tags and metadata associated with individual sectors of data cached in the in the SRAM data cache 224. Page tags 314 can include tags and metadata associated with pages of data cached in the DRAM data cache 230. For example, sector tags and page tags can include data identifying whether a sector is valid, dirty, or how long since the sector has been accessed. This data can enable the caching component 113 to identify whether data should be written back to the 3D cross-point memory 240 if the data is dirty, etc.

In one example, when a read request is received at the memory sub-system controller 115, a host address is included in the request. At least a portion of the host address can be used to determine if the data is cached at the SRAM data cache 224 or the DRAM data cache 230. The memory sub-system controller 115 can calculate the full host address using the tags of the sectors cached in the SRAM data cache 224 to determine if the data is cached in the SRAM data cache 224. If the data is cached in the SRAM data cache 224, metadata associated with the sector tag that was matched (e.g., host access data 316) can be updated accordingly and the data can be returned to the host system. If there is a miss in the DRAM data cache 230, then the caching component 113 can determine whether a DRAM page 235A-F should be evicted and replaced with the page associated with the requested sector. If the caching component 113 determines, based on the host access data 316, that the requested data, and/or the page associated with the requested data has a high access rate, then the accessed sector in the SRAM data cache 224 can be transferred to the DRAM data cache 230 along with the remaining sectors of the page. For example, if sector 245A is in the SRAM data cache 224 but not in the DRAM data cache 230, a page (e.g., DRAM page 235A) can be evicted. The eviction can be based on the least recently used page or any other eviction algorithm. The caching component 113 can then determine that the page 242A (the page in which sector 245A resides) should be copied to DRAM page 235A. The sector 245A, which is already in SRAM can be combined with sectors 245B and 245C (e.g., in a write buffer) and then copied into the DRAM data cache 230. Thus, using access data for sectors in the SRAM data cache 224 combined with access data for pages in the DRAM data cache 230, the caching component can determine which pages to cache in the DRAM data cache 230.

Although DRAM data cache 230 and 3D cross-point memory 240 are depicted with a specific number of pages and sectors, it should be noted that the DRAM data cache 230 can include any number of pages and 3D cross-point memory 240 can include any number of pages and sectors.

Figure 4:
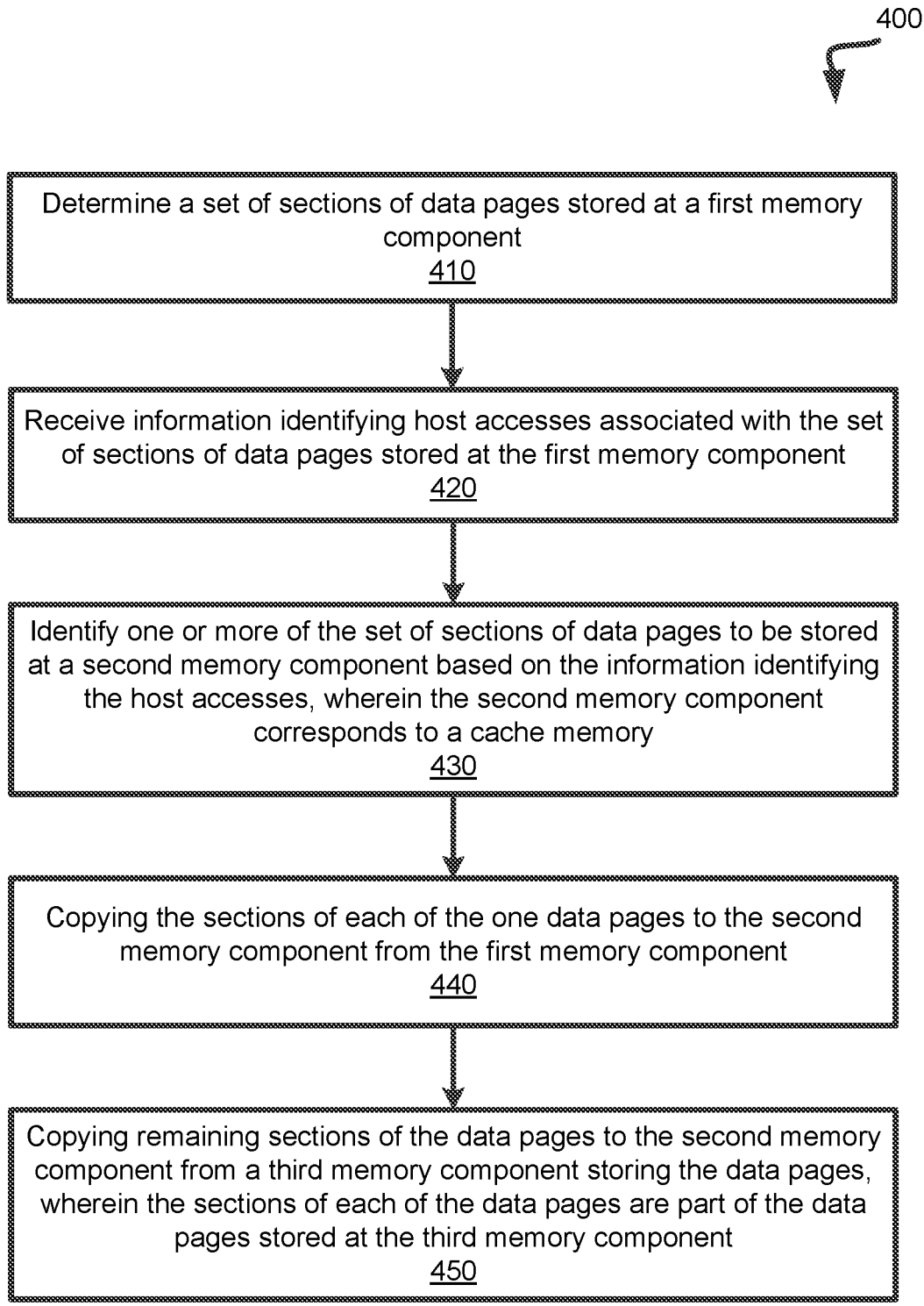
FIG. 4 is a flow diagram of an example method to cache data in a memory component of a dual in-line memory module, in accordance with some embodiments of the present disclosure.

FIG. 4 is a flow diagram of an example method 400 to cache data stored in 3D cross-point memory in a low access latency memory to reduce access latency of a hybrid DIMM, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the caching component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing device determines a set of sections of data pages stored at a first memory component. The first memory component can be a low latency, low capacity type of memory, such as SRAM. SRAM can store, transfer, and manage data at a small granularity (small data size). The smallest granularity can be referred to as a section, or sector, of a data page.

At operation 420, the processing device receives information identifying host accesses associated with the set of sections of data pages stored at the first memory component. The metadata associated with each section of data can be relatively small due to the large number of sections to track and the limited lifetime of individual sectors in the SRAM. However, metadata associated with larger pages that sections are associated with can include additional metadata to track access of the pages. The data associated with access of the sections can be aggregated to the page level. Thus, the information identifying host accesses can indicate how often and when (how recently) a data page and/or a section of a page is accessed.

At operation 430, the processing device identifies one or more of the set of sections of data pages to be stored at a second memory component based on the information identifying the host accesses, wherein the second memory corresponds to a cache memory. The processing device can use a set of heuristics that can determine which data is most likely to be accessed again soon, or very often. The data that is indicated as being likely to be accessed can thus be identified as pages that should be stored in the second memory component. The second memory component can be a type of low latency access memory such as DRAM with a large enough capacity to perform as a cache for the larger capacity 3D cross-point memory. The DRAM can be used to store data pages that are most likely to be accessed so that the hit rate of the DRAM as a cache is very high.

At operation 440, the processing device copies the one or more sections of the data pages to the second memory component from the first memory component. Finally, at operation 450, the processing device copies the remaining sections of the data pages to the second memory component from a third memory component. Copying the one or more sections of data at the first memory component comprising SRAM to the second memory component comprising DRAM can include retrieving the remaining sections of the data pages associated with the one or more sections of data at the SRAM from the third memory component comprising 3D cross-point memory, combining the one or more sections with their corresponding remaining sections (e.g., in a write buffer) and copying the full data pages into the DRAM. For example, when a section of a data page is to be cached in the DRAM, the section of the data page is combined with the additional sections of the data page retrieved from 3D cross-point to be cached as a contiguous page of memory in the DRAM. Therefore, based on accesses of individual sections of data pages, an entire data page can be selected to be cached in the DRAM.

Figure 5:
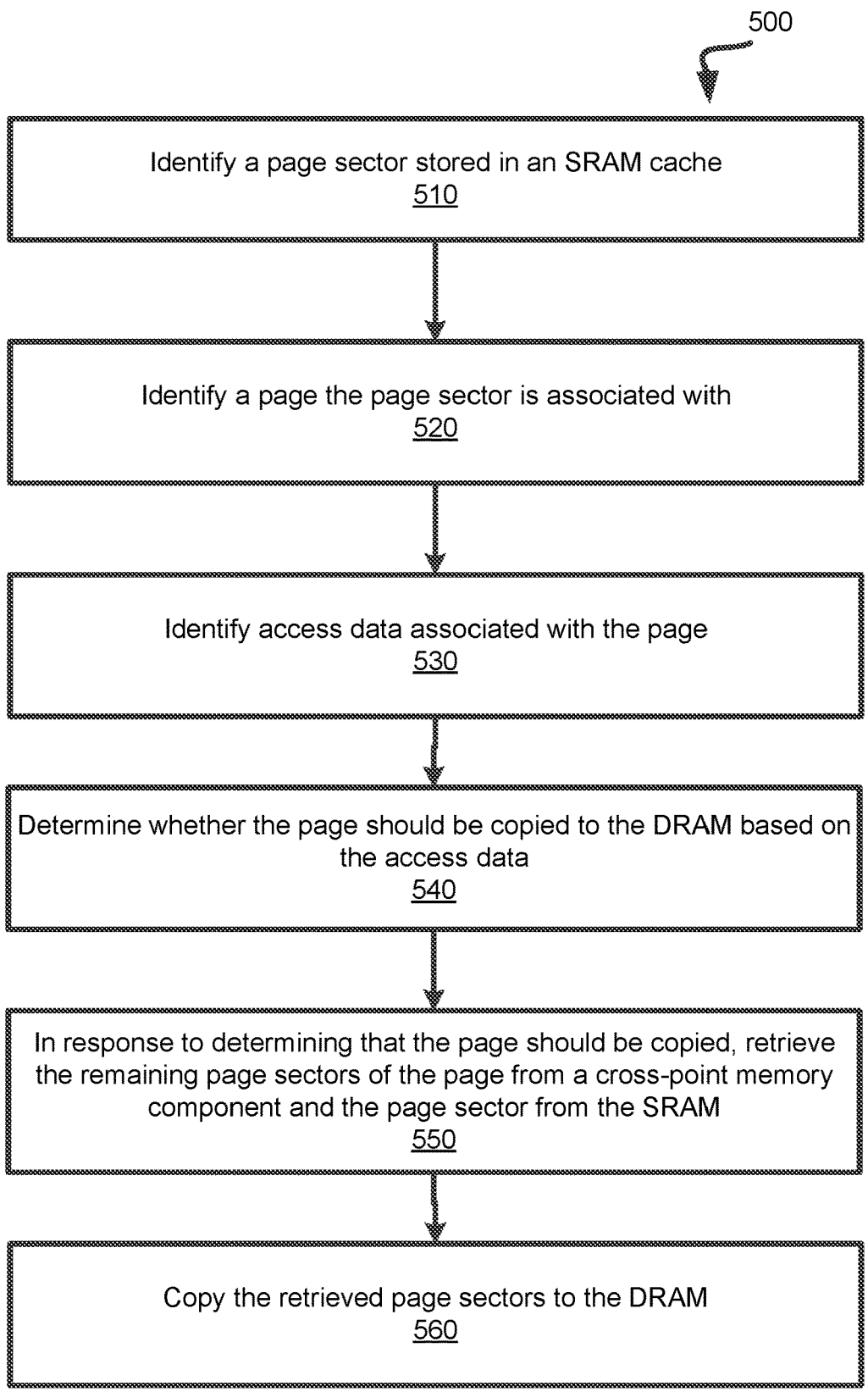
FIG. 5 is a flow diagram of an example method to perform caching between memory components in a hybrid dual in-line memory module.

FIG. 5 is a flow diagram of an example method 500 to cache data stored in a 3D cross-point memory component in a DRAM memory component of a hybrid DIMM, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the caching component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing device identifies a sector stored in an SRAM cache. The SRAM cache can have a low storage capacity but a low access latency and high bandwidth for sequential reads and writes. The SRAM cache can receive each data access request and temporarily cache the data associated with the requests. The SRAM can store and manage data at a sector granularity (smaller portion of a page) and can track the number, timing, and rate of access to each of the sectors stored in the SRAM. Then, the access data can be aggregated for a larger page which can have an associated metadata tag that stores more information about the page than sector tags.

At operation 520, the processing device identifies a page (e.g., a page of data located in the 3D cross-point) that the sector stored in the SRAM is associated with (e.g., the page that the sector is a part of). The page can be a group of sectors that are stored in the 3D cross-point that are grouped together into a larger page that can be stored at the DRAM data cache when needed.

At operation 530, the processing device identifies access data associated with the page. The access data can be aggregated data of each of the sectors included in a data page. The access data can include the rate of access of a sector and page (i.e., temperature), how recently the data has been accessed (least recently accessed data), and how likely the data is to be accessed in the near future. For example, a heuristic algorithm can determine based on access patterns that certain data has a high likelihood of imminent access and that other data has a low likelihood of access.

At operation 540, the processing device determines whether the data page associated with the sector should be copied to the DRAM data cache based on the access data identified at operation 530. The processing device can use the heuristic algorithms identifying the likelihood of access to select which data should be cached in the DRAM. To maximize the hit rate of the data in the DRAM cache, the data that has the highest likelihood of future access is cached in the DRAM. For example, data that is very hot (high rate of access) can be likely to be accessed again very soon. Therefore, data that is very hot can be cached in the DRAM data cache so that data can be accessed quickly by future operations.

At operation 550, the processing device retrieves the remaining page sectors of the page from a 3D cross-point memory component and the sector stored in the SRAM. The processing device can combine the remaining sectors and the sector from the SRAM into a write buffer so that the entire page can be moved into the DRAM data cache. At operation 560, the processing device copies the data page comprised of the retrieved data page sectors from 3D cross-point and the SRAM into the DRAM. Thus, the entire data page can be copied to DRAM so that future operations can quickly access the data from the low latency DRAM data cache.

Figure 6:
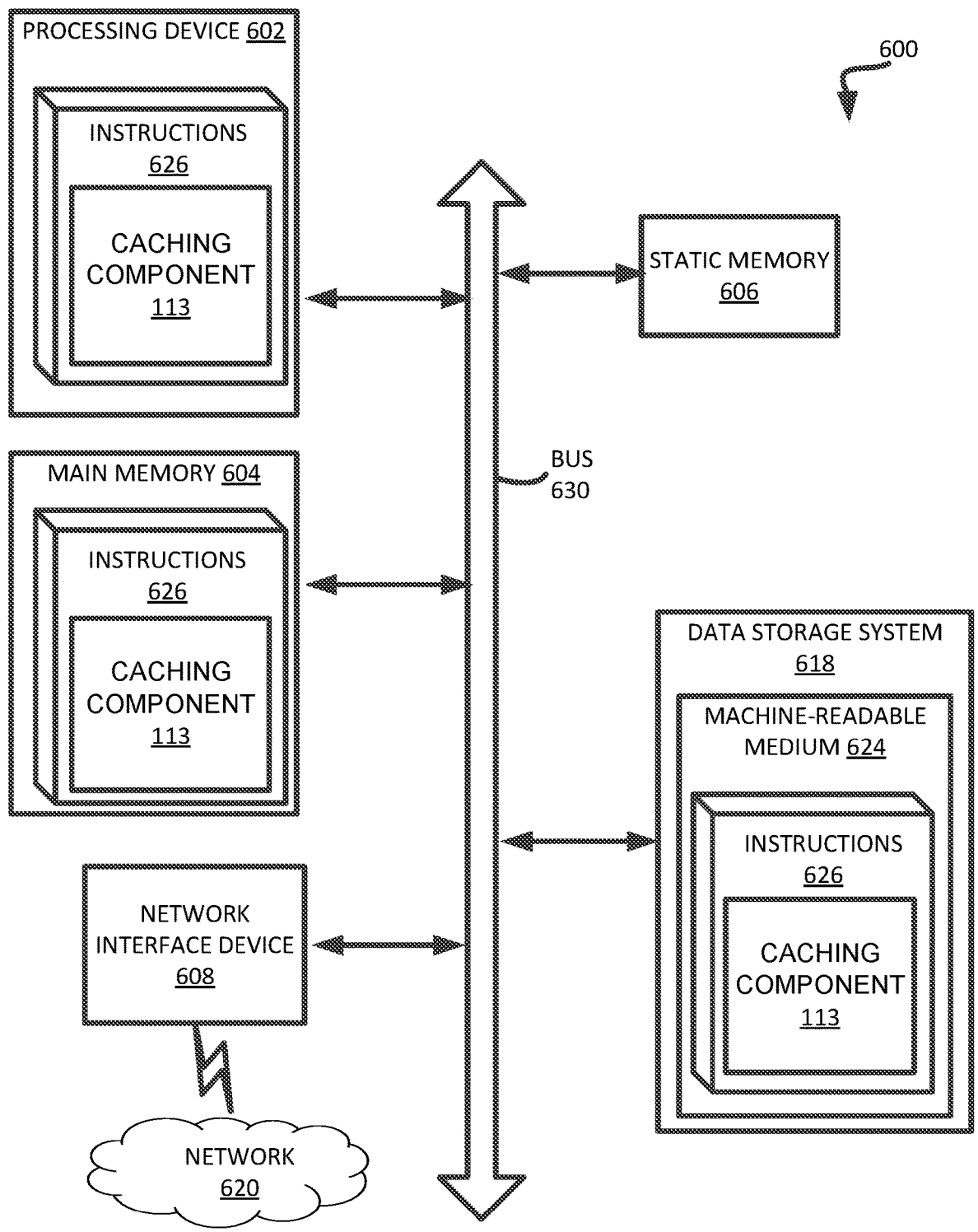
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the caching component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a caching component (e.g., the caching component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a first memory component comprising a first memory type;
   a second memory component comprising a second memory type coupled to the first memory component, wherein the second memory type has a higher access latency than the first memory component;
   a third memory component comprising a third memory type coupled to the first memory component and the second memory component, wherein the third memory component has a higher access latency than the first and second memory components; and
   a processing device, operatively coupled with the first memory component, the second memory component, and the third memory component, to perform operations comprising:
      identifying a section of a data page stored in the first memory component;
      identifying access patterns associated with the data page and the section of the data page;
      determining to cache the data page at the second memory component based on the access patterns;
      retrieving the section of the data page stored in the first memory component;
      retrieving one or more additional sections of the data page stored at the third memory component;
      combining the section of the data page from the first memory component comprising the first memory type with the one or more additional sections of the data page from the third memory component comprising the third memory type into a contiguous page; and
      copying the contiguous page to the second memory component comprising the second memory type.

2. The system of claim 1, wherein the third memory type corresponds to a cross-point array memory, the second memory type corresponds to a dynamic random access memory (DRAM), and the first memory type corresponds to static random access memory (SRAM).

3. The system of claim 1, wherein the access patterns comprise an aggregation of a plurality of sections included in the data page.

4. The system of claim 3, wherein the third memory component has a higher data capacity than the first memory component and the second memory component, and wherein the data cached at the second memory component is also stored at the third memory component.

5. The system of claim 3, wherein the first memory component, second memory component, third memory component and a cache manager are located within a hybrid dual in-line memory module and wherein the cache manager communicates with a host system through a variable latency interface protocol.

6. The system of claim 1, wherein the processing device is further to determine whether data is to be cached at the second memory component based on access data associated with page cache tags and sector cache tags used to track data access patterns.

7. The system of claim 1, wherein data stored at the third memory component is accessed at a higher granularity than data stored at the second memory component.

8. A method comprising:
   determining a plurality of sections of data pages stored at a first memory component comprising a first memory type;
   receiving information identifying host accesses associated with the plurality of sections of data pages stored at the first memory component;
   identifying, by a processing device, one or more of the plurality of sections of data pages to be stored at a second memory component comprising a second memory type based on the information identifying the host accesses, wherein the second memory component corresponds to a cache memory;
   retrieving the one or more sections of each of the one or more data pages from the first memory component;
   retrieving one or more remaining sections of each of the data pages from a third memory component comprising a third memory type storing the data pages, wherein the one or more sections are part of the data page stored at the third memory component;
   combining the one or more sections of each of the one or more data pages from the first memory component comprising the first memory type with the one or more remaining sections of each of the data page from the third memory component comprising the third memory type into a contiguous page; and
   copying the contiguous page to the second memory component comprising the second memory type.

9. The method of claim 8, wherein the first memory component has a lower access latency than the second and third memory components, and wherein the second memory component has a lower access latency than the third memory component.

10. The method of claim 8, wherein the information identifying host accesses corresponds to a number of times that a host system has requested access to a particular data page associated with the one or more sections of data pages and additional data based on when the host accesses occurred.

11. The method of claim 8, wherein the first memory component is managed at a granularity corresponding to a size of a section of a data page and the second memory component is managed at a granularity corresponding to a size of a data page, wherein the size of a data page is larger than the size of a section of a data page.

12. The method of claim 8, wherein the first memory component corresponds to a static random access memory (SRAM) and the second memory component corresponds to a dynamic random access memory (DRAM).

13. The method of claim 8, wherein the third memory component corresponds to a three-dimensional cross-point (3D cross-point) memory.

14. A non-transitory computer-readable storage medium comprising instructions that, when executed by a processing device, cause the processing device to:
   determining a plurality of sections of data pages stored at a first memory component comprising a first memory type;
   receiving information identifying host accesses associated with the plurality of sections of data pages stored at the first memory component;
   identifying, by a processing device, one or more of the plurality of sections of data pages to be stored at a second memory component comprising a second memory type based on the information identifying the host accesses, wherein the second memory component corresponds to a cache memory;
   retrieving the one or more sections of each of the one or more data pages from the first memory component;
   retrieving one or more remaining sections of each of the data pages from a third memory component comprising a third memory type storing the data pages, wherein the one or more sections are part of the data page stored at the third memory component
   combining the one or more sections of each of the one or more data pages from the first memory component comprising the first memory type with the one or more remaining sections of each of the data page from the third memory component comprising the third memory type into a contiguous page; and
   copying the contiguous page to the second memory component comprising the second memory type.

15. The non-transitory computer-readable storage medium of claim 14, wherein the first memory component has a lower access latency than the second and third memory components, and wherein the second memory component has a lower access latency than the third memory component.

16. The non-transitory computer-readable storage medium of claim 14, wherein the information identifying host accesses corresponds to a number of times that a host system has requested access to a particular data page associated with the one or more sections of data pages and additional data based on when the host accesses occurred.

17. The non-transitory computer-readable storage medium of claim 14, wherein the first memory component is managed at a granularity corresponding to a size of a section of a data page and the second memory component is managed at a granularity corresponding to a size of a data page, wherein the size of a data page is larger than the size of a section of a data page.

18. The non-transitory computer-readable storage medium of claim 14, wherein the first memory component corresponds to a static random access memory (SRAM), the second memory component corresponds to a dynamic random access memory (DRAM), and the third memory component corresponds to a three-dimensional cross-point (3D cross-point) memory.

* * * * *